US008562003B2

(12) United States Patent
Reep

(10) Patent No.: US 8,562,003 B2
(45) Date of Patent: Oct. 22, 2013

(54) CART BRAKE AND CART WITH USER-OPERABLE BRAKE

(76) Inventor: Larry D. Reep, Huntersville, NC (US)

(*) Notice: Subject to any disclaimer, the term of this patent is extended or adjusted under 35 U.S.C. 154(b) by 0 days.

(21) Appl. No.: 13/489,802

(22) Filed: Jun. 6, 2012

(65) Prior Publication Data

US 2012/0325593 A1    Dec. 27, 2012

Related U.S. Application Data

(63) Continuation-in-part of application No. 13/169,362, filed on Jun. 27, 2011, now abandoned.

(51) Int. Cl.
*B62D 39/00* (2006.01)
*B62B 5/04* (2006.01)

(52) U.S. Cl.
USPC ........................................ 280/33.994; 188/19

(58) Field of Classification Search
USPC ............ 280/33.994, 33.991, 33.992; 16/35 R; 188/19, 20, 29
See application file for complete search history.

(56) References Cited

U.S. PATENT DOCUMENTS

| | | | | |
|---|---|---|---|---|
| 3,061,049 A * | 10/1962 | Bramley | ........................... | 188/21 |
| 3,095,211 A * | 6/1963 | Altherr | ..................... | 280/33.994 |
| 3,458,015 A * | 7/1969 | Collins et al. | .................... | 188/29 |
| 3,717,225 A * | 2/1973 | Rashbaum et al. | ............. | 188/29 |
| 4,706,975 A * | 11/1987 | Arena et al. | .............. | 280/33.992 |
| 4,840,388 A * | 6/1989 | Doughty | ................... | 280/33.994 |
| 5,090,517 A * | 2/1992 | Doughty | ........................... | 188/19 |
| 5,288,089 A * | 2/1994 | Bowers et al. | ........... | 280/33.994 |
| 5,499,697 A * | 3/1996 | Trimble et al. | .................. | 188/19 |
| 5,649,718 A * | 7/1997 | Groglio | ......................... | 280/641 |
| 5,735,367 A * | 4/1998 | Brubaker | ......................... | 188/19 |
| 6,199,878 B1 * | 3/2001 | Masserant et al. | ........ | 280/33.994 |
| 6,676,139 B1 * | 1/2004 | Saccani | ..................... | 280/33.991 |
| 7,401,795 B2 * | 7/2008 | St. Clair | .................... | 280/33.994 |

* cited by examiner

*Primary Examiner* — J. Allen Shriver, II
*Assistant Examiner* — James M Dolak
(74) *Attorney, Agent, or Firm* — Alex R. Hobson; Invention To Patent Services

(57) ABSTRACT

A brake for a wheeled cart of the type having a container supported on at least a pair of rear wheels carried on a cart frame, that includes a brake manipulator pivotally mounted on the cart frame in, and including a handle portion and a cam portion. An elongate brake member is pivotally attached to the manipulator and extends into a position proximate the at least one. A braking element is positioned on a lower end of the brake member for being selectively moved into and out of frictional braking engagement with a tread surface of the wheel.

16 Claims, 14 Drawing Sheets

CART BRAKE AND CART WITH USER-OPERABLE BRAKE

CROSS-REFERENCE TO RELATED APPLICATIONS

This application is a non-provisional continuation-in-part application claiming the benefit of current co-pending parent application having application Ser. No. 13/169,362 filed on Jun. 27, 2011.

TECHNICAL FIELD AND BACKGROUND OF THE INVENTION

This invention relates to a cart brake intended for use on wheeled carts of the general type used by shoppers in stores to hold and transport selected goods while shopping, and to transport the goods to a checkout location and, optionally, into a parking lot where the goods are transferred to a vehicle. These carts may have a goods-holding container made of intersecting metal wire or rod stock, solid or perforated plastic. A laterally-extending bar handle extends across the rear of the container by which the cart can be pulled, pushed and steered by the user. Many of these carts also include a rear-facing child seat. The brake invention also encompasses use on similar carts often used in airports to transport luggage to and from luggage check areas.

These containers are typically mounted on a frame which is, in turn, mounted on a pair of rear wheels and a pair of front steerable caster wheels. These carts are often taken into areas, such as parking lots or ramps that are sloped, with a heavy load. If the user takes his or her hands off of the handle when, for example, unloading the contents of the container or lifting a child from the child seat, the cart may begin to roll away from the user. It may impact nearby vehicles or turn over, causing damage to the vehicles and the cart. If a child is seated in the child seat, the child may be injured.

These carts are not known to include a brake. The user is responsible having another person hold the cart while it is being unloaded, or may rest the cart against a stationary support when unloading goods or a child to maintain the cart in a stationary condition in order to prevent damage and/or injury.

For this reason, there is a need for a brake that can either be installed during manufacture of the cart, or easily and quickly retrofitted to existing fleets of carts at their use location, such as a grocery store or home center store.

SUMMARY OF THE INVENTION

Therefore, it is an object of the invention to provide a brake for carts.

It is a further object of the invention to provide a simple, inexpensive and easy to use cart brake.

It is yet another object of the invention to provide a brake that can either be installed during manufacture of the cart, or easily and quickly retrofitted to existing fleets of carts at their use location.

These and other objects and advantages of the invention are achieved by providing a brake for a wheeled cart of the type having a container supported on at least a pair of rear wheels carried on a cart frame, that includes a brake mounting bracket mounted on the cart frame in a generally vertical orientation to at least one of the rear wheels, and a lock having a first, unlocked position and a second, unlocked position. An elongate brake member is mounted in the bracket and extends into a position proximate the at least one wheel and cooperates with the lock. A braking elements is positioned on a lower end of the brake member for being selectively moved into and out of frictional braking engagement with a tread surface of wheel.

According to one preferred embodiment of the invention, the brake member includes a rod, and includes an actuator handle on an upper end thereof for being manually operated by a user to move the rod into and out of braking engagement.

According to another preferred embodiment of the invention, the brake member includes a rod, and includes an actuator handle on an upper end thereof for being manually operated by a user to move the rod into and out of braking engagement, and the braking element includes a terminal portion of the rod extending perpendicularly across a width of the tread surface of the wheel.

According to another embodiment of the invention, the lock includes a vertically-oriented C-shaped slot, for receiving an upper portion of the brake member, and further wherein when the brake member is positioned in an upper recess of the slot the brake is in the unlocked position and when the brake member is positioned in a lower recess of the slot the brake is in the locked position with the braking element in frictional braking engagement with the tread surface of the wheel.

According to another embodiment of the invention, a retainer ring is positioned to the cart frame below the brake mounting bracket and proximate the at least one rear wheel within which the elongate brake member is positioned for guiding the brake member in its movement into and out of braking engagement.

According to another embodiment of the invention, a brake is provided for a wheeled cart of the type having a container supported on at least a pair of rear wheels carried on a cart frame, and includes a brake mounting bracket mounted on the cart frame in a generally vertical orientation to at least one of the rear wheels, and including a lock having a first, unlocked position and a second, unlocked position. An elongate brake member is mounted in the bracket and extends into a position proximate the at least one wheel and cooperates with the lock. The brake member comprises a rod, and includes an actuator handle on an upper end thereof for being manually operated by a user to move the rod into and out of braking engagement. A braking element is positioned on a lower end of the brake member for being selectively moved into and out of frictional braking engagement with a tread surface of the wheel, and includes a terminal portion of the rod extending perpendicularly across a width of the tread surface of the wheel.

According to another embodiment of the invention, the lock includes a vertically-oriented C-shaped slot for receiving an upper portion of the brake member, and when the brake member is positioned in an upper recess of the slot, the brake is in the unlocked position and when the brake member is positioned in a lower recess of the slot the brake is in the locked position with the braking element in frictional braking engagement with the tread surface of the wheel.

According to another embodiment of the invention, a retainer ring positioned to the cart frame below the brake mounting bracket and proximate the at least one rear wheel within which the elongate brake member is positioned for guiding, the brake member in its movement into and out of braking engagement.

According to another embodiment of the invention, the upper portion of the brake member includes a handle mounted on a pivot with the rod attached to the handle intermediate the slot and the pivot.

According to another embodiment of the invention, the combination of a brake with a wheeled cart of the type having a container supported on at least a pair of rear wheels carried on a cart frame is provided and includes a brake mounting bracket mounted on the cart frame in a generally vertical orientation to at least one of the rear wheels, and includes a lock having a first, unlocked position and a second, unlocked position. An elongate brake member is mounted in the bracket and extending into a position proximate the at least one wheel and cooperating with the lock. A braking element is positioned on a lower end of the brake member for being selectively moved, into and out of frictional braking engagement with a tread surface of the wheel.

According to another embodiment of the invention, the brake member comprises a rod, and includes an actuator handle on an upper end thereof for being manually operated by a user to move the rod into and out of braking engagement, and the braking element comprises a terminal portion of the rod extending perpendicularly across a width of the tread surface of the wheel.

According to another embodiment of the invention, the lock includes a vertically-oriented C-shaped slot for receiving an upper portion of the brake member. When the brake member is positioned in an upper recess of the slot the brake is in the unlocked position. When the brake member is positioned in a lower recess of the slot the brake is in the locked position with the braking element in frictional braking engagement with the tread surface of the wheel.

According to another embodiment of the invention, a retainer ring is positioned to the cart frame below the brake mounting bracket and proximate the at least one rear wheel within which, the elongate brake member is positioned for guiding the brake member in its movement into and out of braking engagement.

According to another embodiment of the invention, the cart comprises a netstable grocery-type cart.

According to another embodiment of the invention, the upper portion of the brake member includes a handle mounted on a pivot with the rod attached intermediate the slot and the pivot.

According to another embodiment of the invention, rather than using the mounting bracket and the C-shaped slot, the invention utilizes a brake manipulator pivotally attached to the cart frame for applying the brake to at least one of the rear wheels. The brake manipulator has a handle portion and a cam portion for operating the brake. A handle pivot opening is located near a top portion of the cam portion at a point of pivotal attachment to the cart. There is a brake pivot opening displaced from the handle pivot opening by suitable distance and located near a bottom portion of the cam portion. The brake manipulator operates from a braked position where the handle portion is parallel or almost parallel with an upright member of the cart frame to a free position where the handle portion is perpendicular or almost perpendicular to the upright member of the cart frame. This embodiment also includes an elongate brake member pivotally attached to the brake manipulator at the brake pivot opening, and extends to a position proximate the at least one wheel. It also includes a braking element positioned on a lower end of the brake member for being selectively moved into and out of frictional braking engagement with the tread surface of the wheel.

According to another embodiment of the invention, the brake member also has a U-shaped channel attached to the brake manipulator at the point of pivotal attachment and a rod attached to the U-shaped channel and to the braking element.

According to another embodiment of the invention, the U-shaped channel is attached to the rod using a threaded connection and has a pair of openings on each side of a pair of upper edges the U that aligns with the brake pivot opening of the brake manipulator.

According to another embodiment of the invention, there is included a brake pivot pin that connects the U-shaped channel and the brake manipulator. The pin passes through the openings of the U-shaped channel. The brake pivot pin is secured with a brake pivot retainer.

According to another embodiment of the invention, the pivotal attachment of the brake manipulator to the cart is achieved by a nut and bolt connection. This connection uses an opening in the cart frame and the handle pivot opening.

According to another embodiment of the invention, the braking element comprises a terminal portion of the rod extending perpendicularly across a width of the tread surface of the wheel.

According to another embodiment of the invention, the suitable distance is correlated to the distance between the tread surface of the wheel and the terminal portion of the rod when the handle portion of the brake manipulator is in the free position such that when the handle portion is in the braked position, the tread surface of the wheel is in frictional contact with the terminal portion of the rod. In this way, the suitable distance actuated by the movement of the cam portion of the manipulator effects movement of the rod and places the terminal portion of the rod either in frictional contact or not just as the handle portion is parallel or perpendicular to the upright of the frame of the cart.

According to another embodiment of the invention, there is also a retainer ring positioned to the cart frame below the handle pivot opening and proximate the at least one rear wheel within which the elongate brake member is positioned for guiding the brake member in its movement into and out of braking engagement.

According to another embodiment of the invention, there is a handle grip covering the portion handle portion of the manipulator. This handle grip can be a plastic, grooves in the handle itself, or other similar device facilitating the gripping of the handle portion by a user.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED
EMBODIMENTS AND BEST MODE

Figure 1:
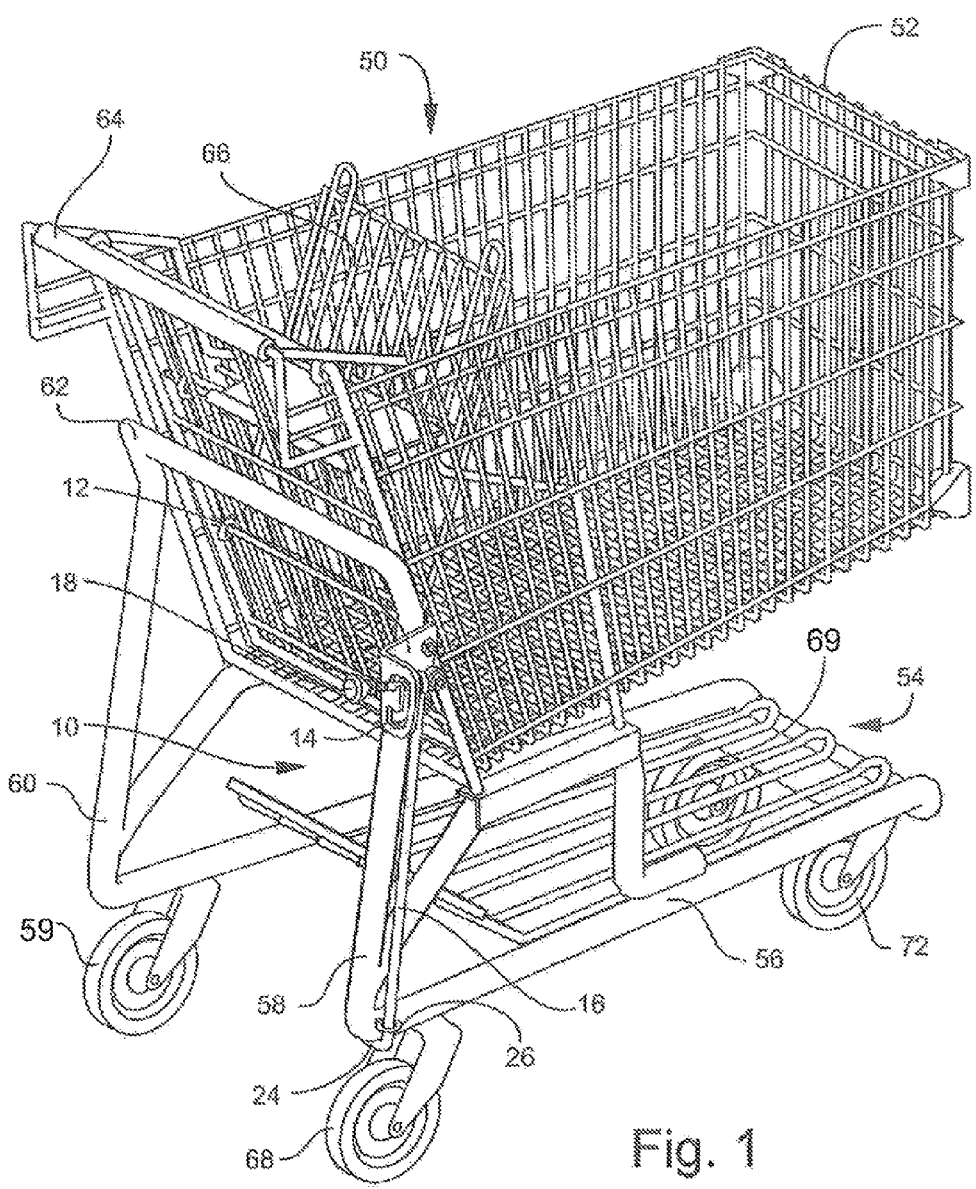
FIG. 1 is an environmental view of a brake according to one preferred embodiment of the invention in place on a conventional grocery-type cart, in its unlocked position.

Referring now specifically to the drawings, a brake according to the present invention is shown generally in FIG. 1 at reference numeral 10, in place on a conventional grocery-type cart 50. The cart 50 itself is conventional and may vary in design and structure. In general, the cmi 50 includes a container, such as a wire basket 52, or a plastic basket, not shown, mounted on a frame 54 that includes a base 56, a pair of uprights 58 and 60, and a cross-member 62. The cmi 50 also includes a handle 64 and a child seat 66. Rear wheels 68, 59 are mounted on stationary axes, and the steerable front wheels 72, 69 are pivotally-mounted on casters.

Figure 2:
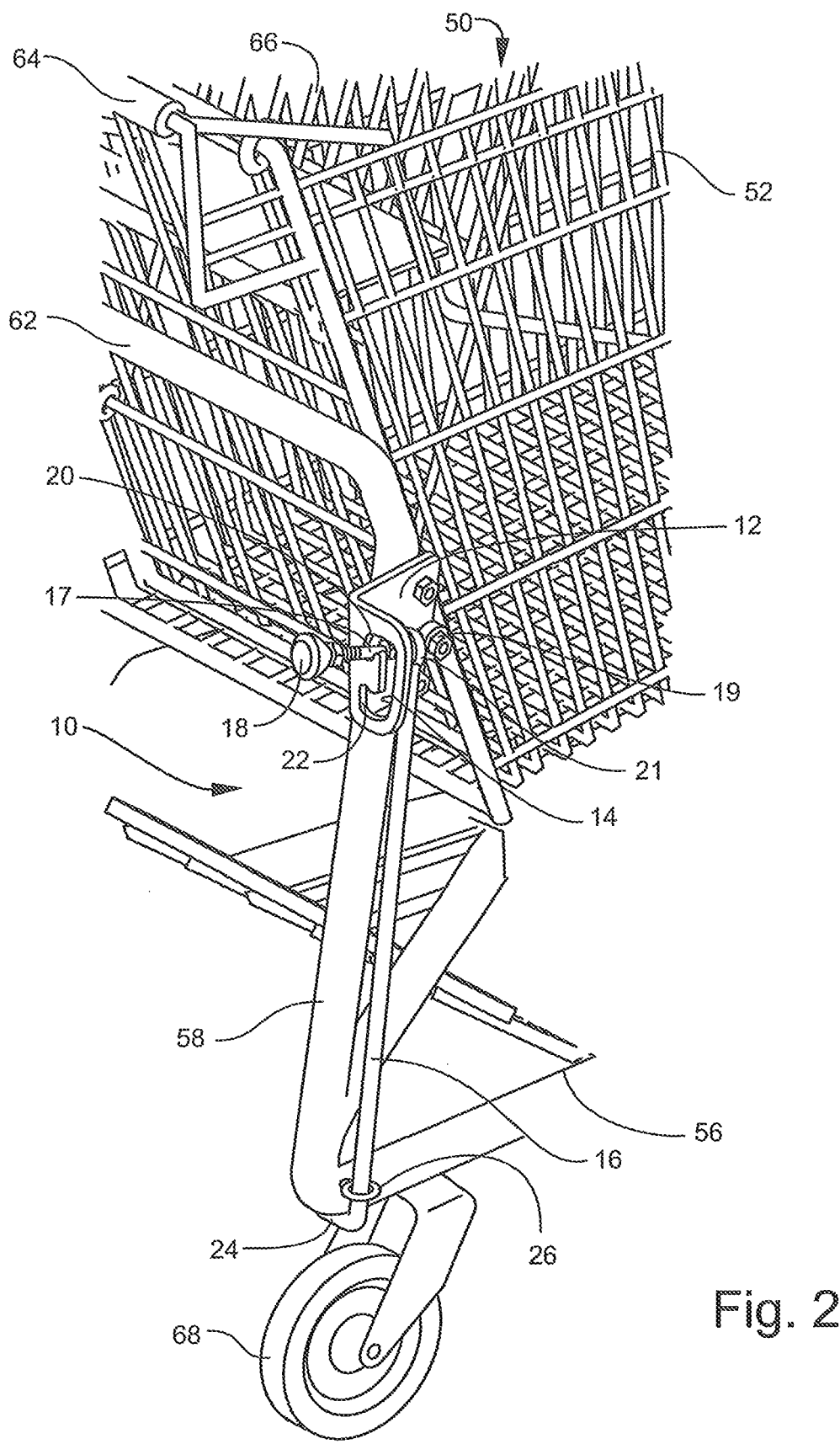
FIG. 2 is a fragmentary environmental view of a brake according to one preferred embodiment of the invention in place on a conventional grocery-type cart, in its unlocked position.
Figure 3:
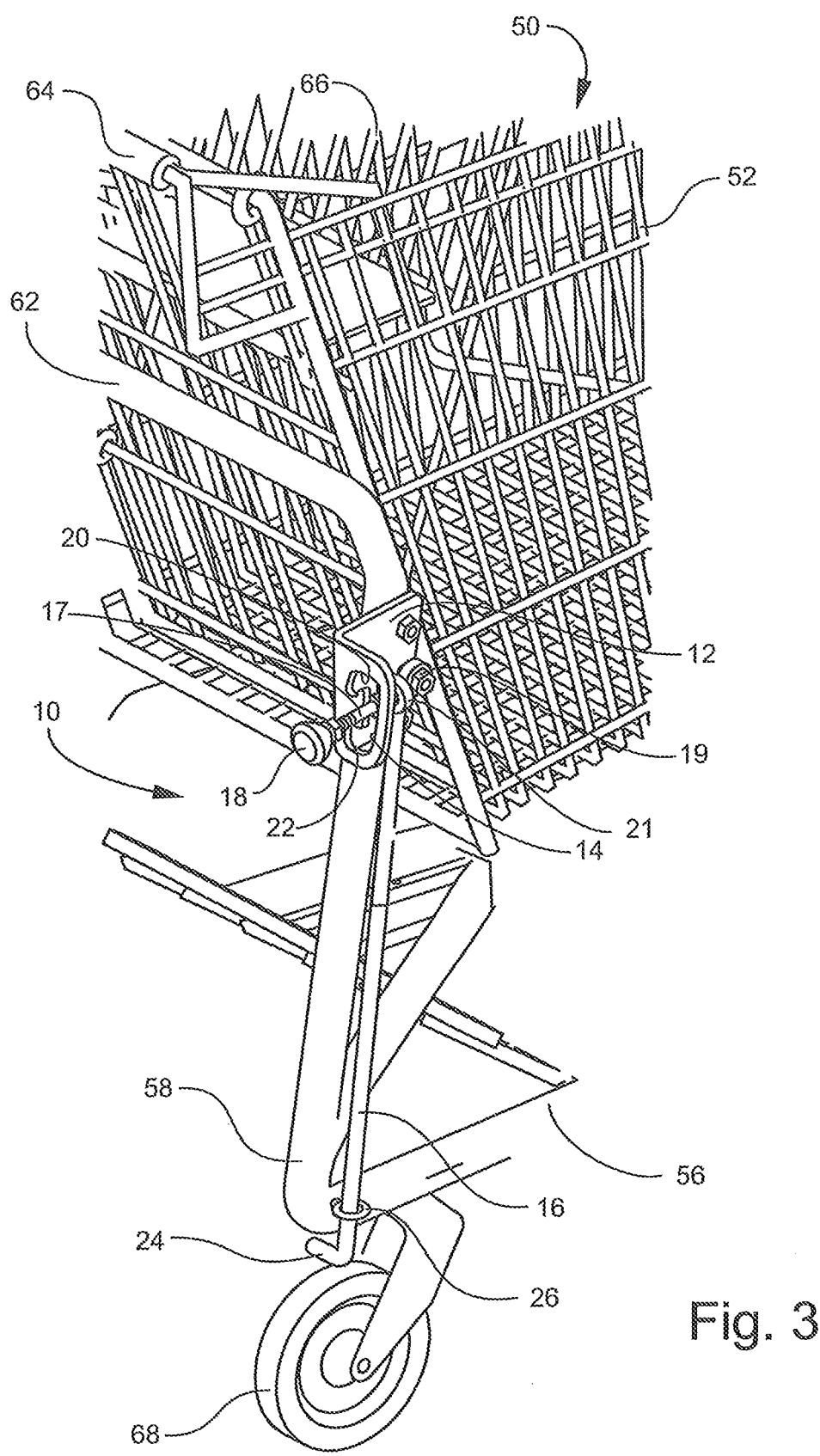
FIG. 3 is a fragmentary environmental view of a brake according to one preferred embodiment of the invention in place on a conventional grocery-type cart, in an intermediate position between its locked and unlocked position.
Figure 4:
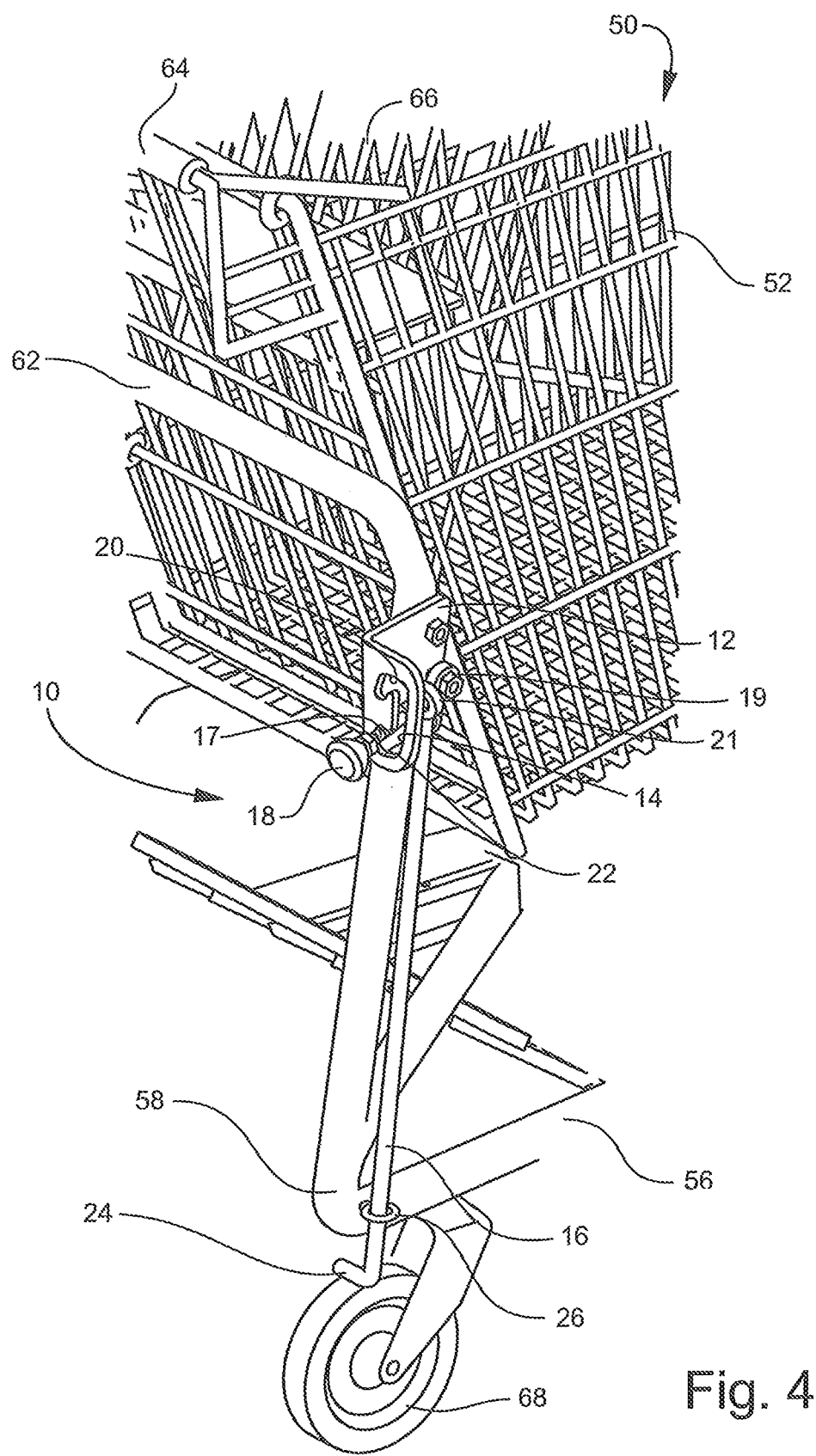
FIG. 4 is a fragmentary environmental view of a brake according to one preferred embodiment of the invention in place on a conventional grocery-type cart, in its locked position.
Figure 5:
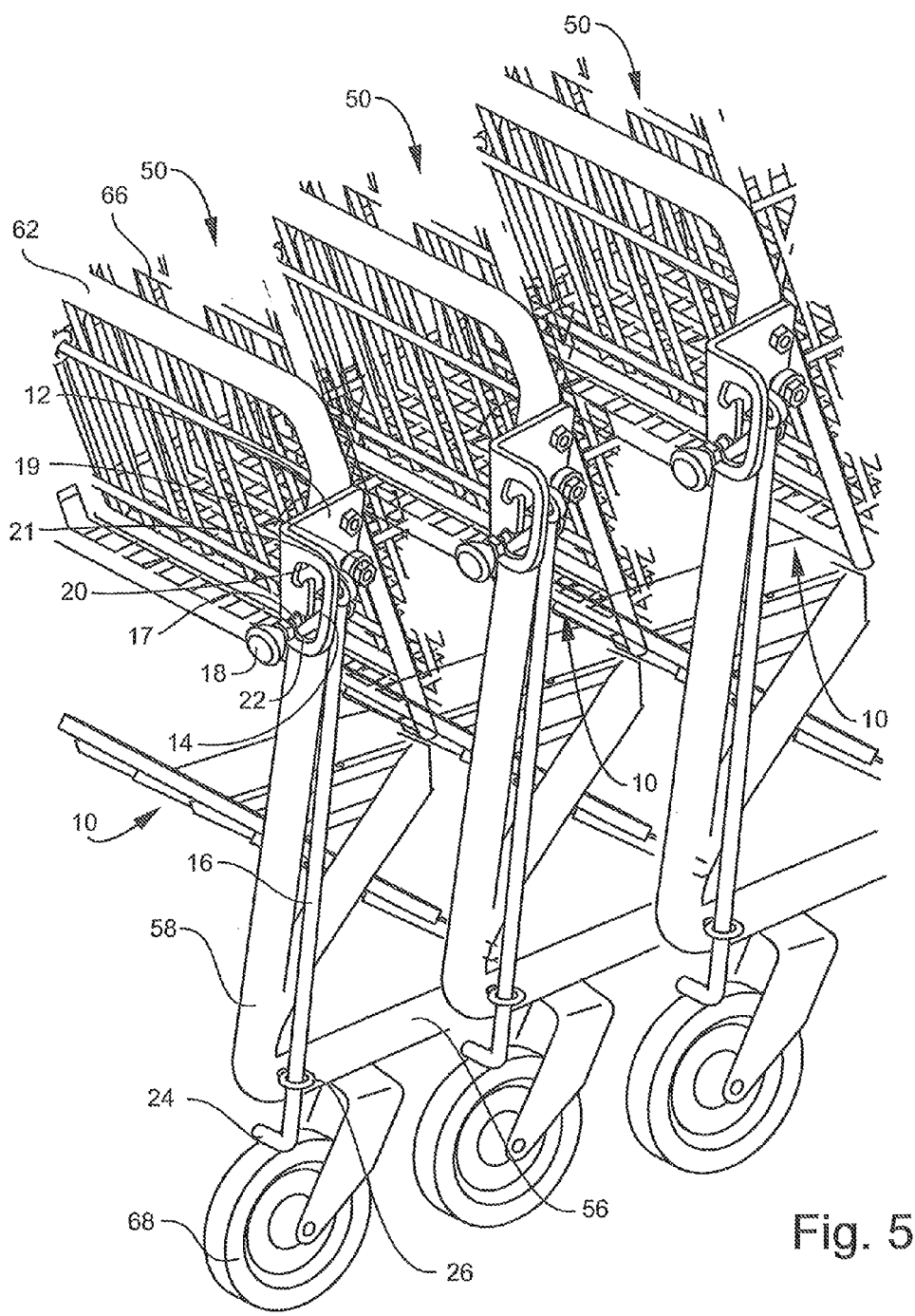
FIG. 5 is a fragmentary environmental view of a brake according to one preferred embodiment of the invention in place on a nested plurality of conventional grocery-type carts, with each of the brakes in their respective locked position.

As is shown in FIGS. 2-5, the brake 10 is selectively moveable between an unlocked position, FIG. 2, an intermediate position, FIG. 3, and a locked position, FIG. 4. As shown in FIG. 5, the carts 50 may be nested in the ordinary manner ready for use for storage or for moving as a group. The brake 50 does not interfere, with nesting of the carts 50, but provides greater safety, since all or only some of the carts can be braked if desired to prevent rolling on a sloped surface.

Figure 6:
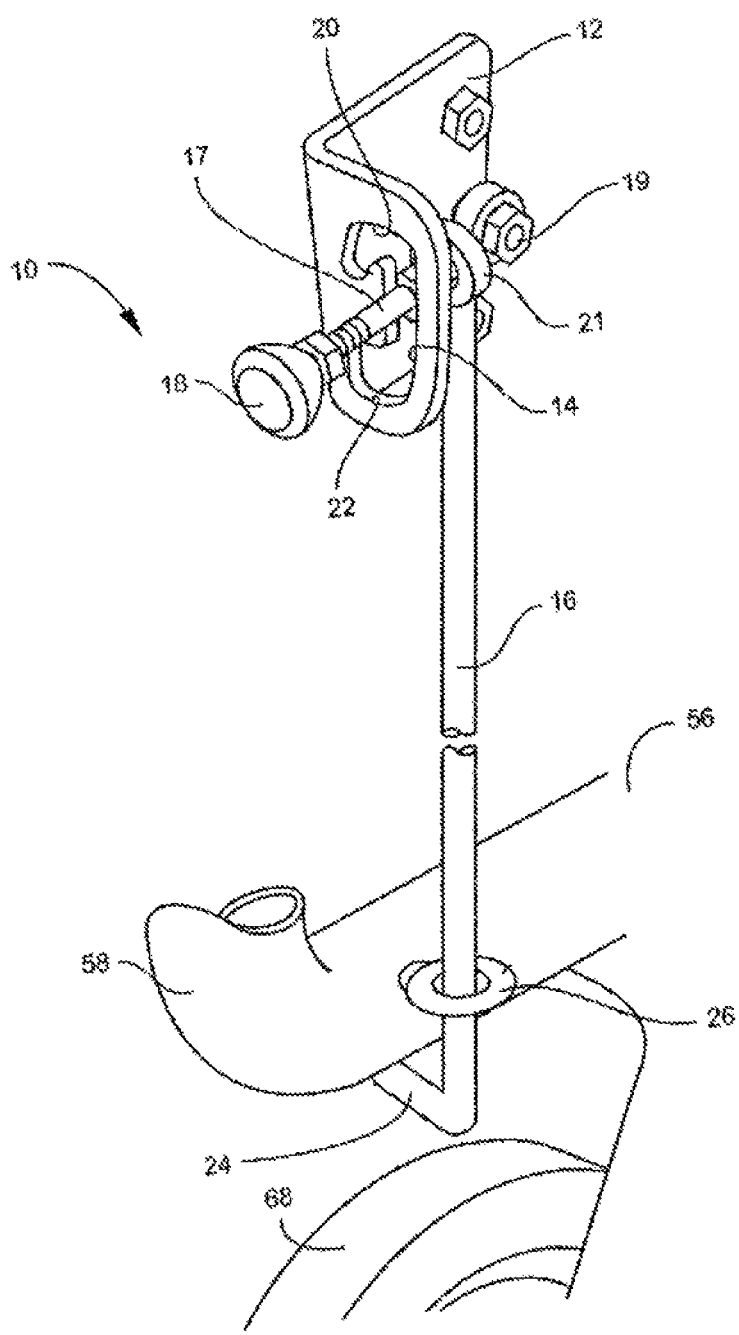
FIG. 6 is a fragmentary enlarged view of the brake according to one preferred embodiment of the invention in its unlocked position.
Figure 7:
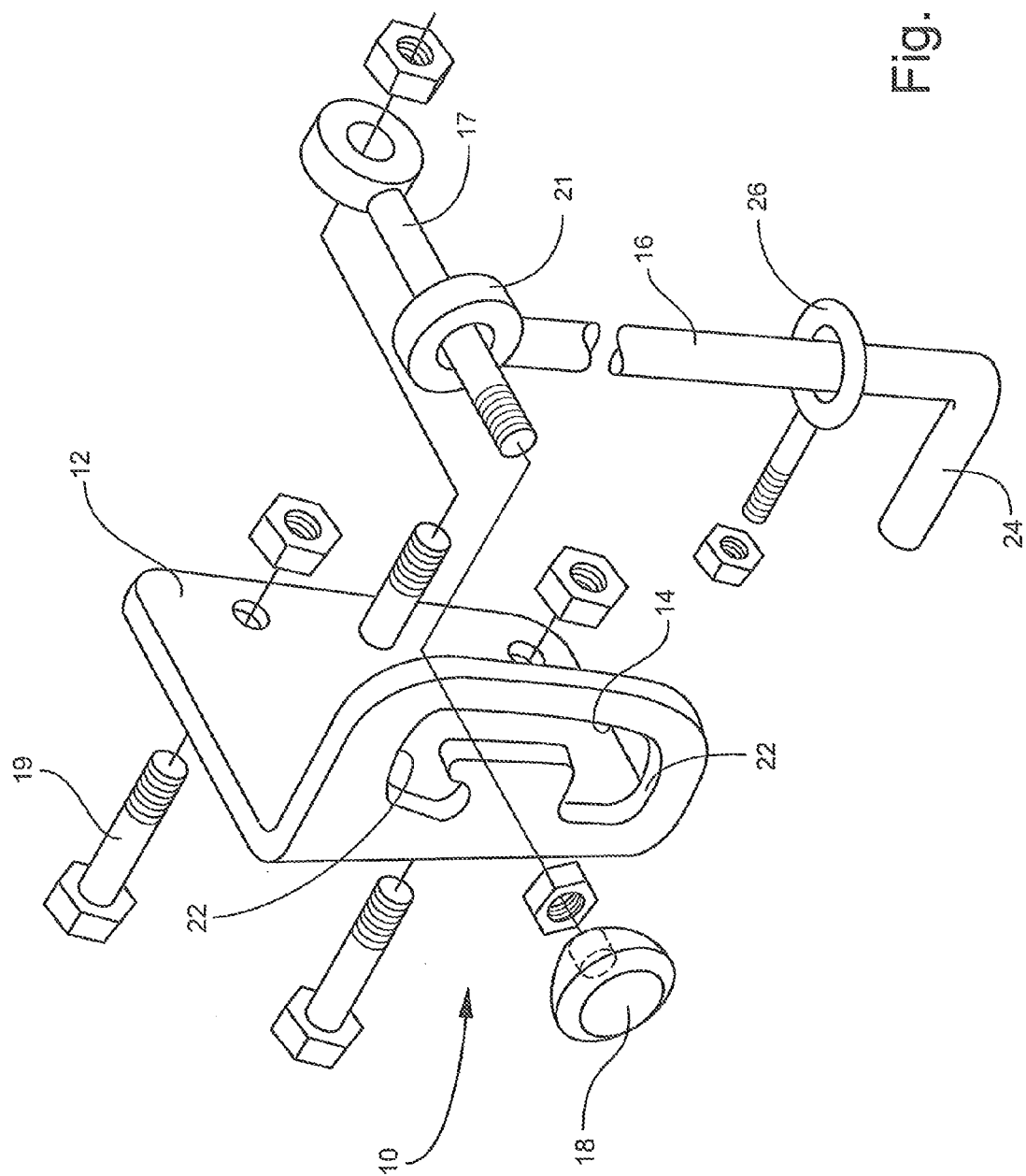
FIG. 7 is an exploded view of the brake shown in FIGS. 1-5, with parts broken away for clarity and compactness.

Referring now more specifically to the design and operation of the brake 10, as is best shown in FIGS. 2, 6 and 7, brake 10 includes a mounting bracket 12 bolted to the upright 58 at a relatively high position on the upright 58. The bracket 12 includes a C-shaped slot 14 in which is mounted a brake member, for example, a rod 16. The upper File No. 4103/1US Page 7 of end of the rod 16 includes a handle bushing 21 through which extends an actuator handle 17 with a knob 18 on the end for being 2 grasped by the user. See, particularly, FIG. 7.

As is shown in each of the drawings, and best shown in FIG. 6, the actuator handle 17 is captured in the slot 14 and is pivotally-mounted on a bolt 19. The handle 17 can therefore be moved upwardly and downwardly by the user in the slot 14. The slot 14 has upper and lower recesses 20, 22 that retain the handle 17 in either the upper recess 20 to maintain the unlocked position, or in the lower recess 22 to maintain the locked position.

The rod 16 is retained in its desired vertical position by a retainer ring 26 mounted to the upright 58.

The lower end of the rod 16 is bent in a perpendicular axial direction across the tread of the wheel 68 to form a braking surface element 24. In the unlocked and intermediate positions, FIGS. 2 and 6, for example, the braking surface element 24 is vertically spaced above the wheel 68. In the locked position, for example, as shown in FIGS. 4 and 7, the handle 17 is captured in the lower recess 22 and the rod 16 is locked into a lowered position. The braking surface element 24 is accordingly pressed against the tread of the wheel 68 with sufficient force to prevent wheel 68 from rotating, thus effecting a braking force to the entire cart 50.

If desired, gripping elements, not shown, can be placed onto or formed in the bottom surface of the braking surface element 24 to increase frictional force on the tread of the wheel 68. These gripping elements may be a rubber or plastic strip with raised gripping, element. Otherwise, teeth may be stamped or cut into the bottom surface of the braking surface element 24 to achieve a similar effect.

The brake 10 is easily attached to the cart 50 during manufacture or retrofitted to an existing inventory at its use location. With the brake 10 in the locked position with the rod 16 in its lowered position with the handle positioned in the lower recess 22, the braking surface element 24 is positioned on the tread of the wheel 68 with a braking pressure. The location of the bracket 12 on the upright 58 is noted and holes are drilled for the bracket bolts. See FIGS. 6 and 7. When mounted, the braking surface element 24 should be in its braking position. Minor adjustments can be made during the life of the brake 10 by enlarging the holes in the bracket 12 as needed, shifting the bracket 12 slightly, and locking the bracket 12 in the adjusted location by retightening the bolts.

In use the handle 18 is high enough that the user can reach and adjust it as needed with only a slight bend to the torso. The brake 10 easily effects a positive braking and locking action, but does not otherwise interfere with use or storage of the cart 50.

Figure 8:
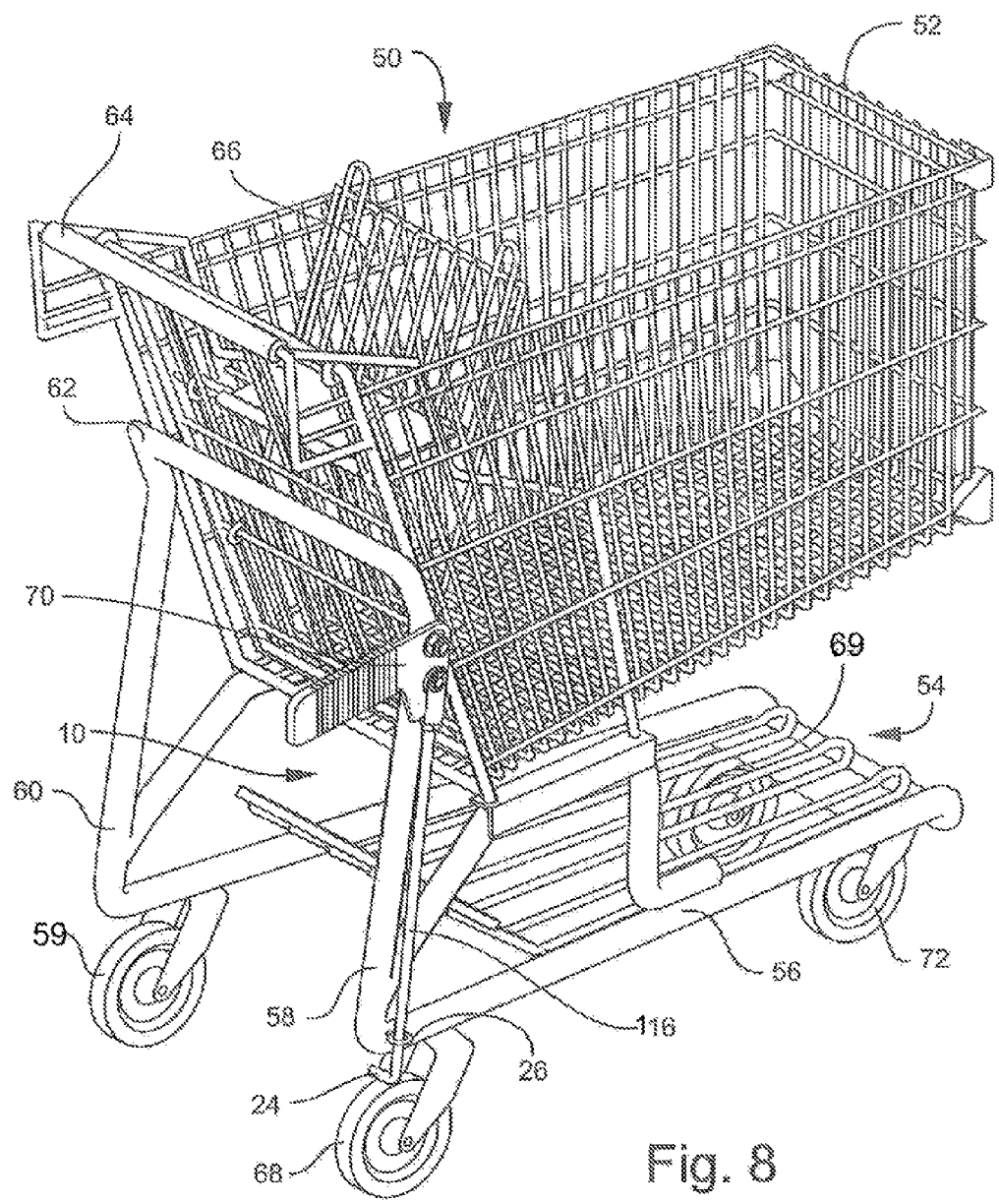
FIG. 8 is an environmental view of a brake according to one preferred embodiment of the invention in place on a conventional grocery-type cart, in its braked position.

Referring to FIG. 8, an embodiment is shown utilizing a brake manipulator 70 cooperating with a brake member 116 and a braking surface element 24. The manipulator is pivotally attached to the cart frame upright 58 arid the manipulator operates the brake member 116 such that the braking surface element 24 comes into frictional contact with the surface tread of the wheel 68 when the manipulator is in the braked position shown in FIG. 8 where the manipulator 70 is roughly perpendicular to the upright 58.

Figure 9:
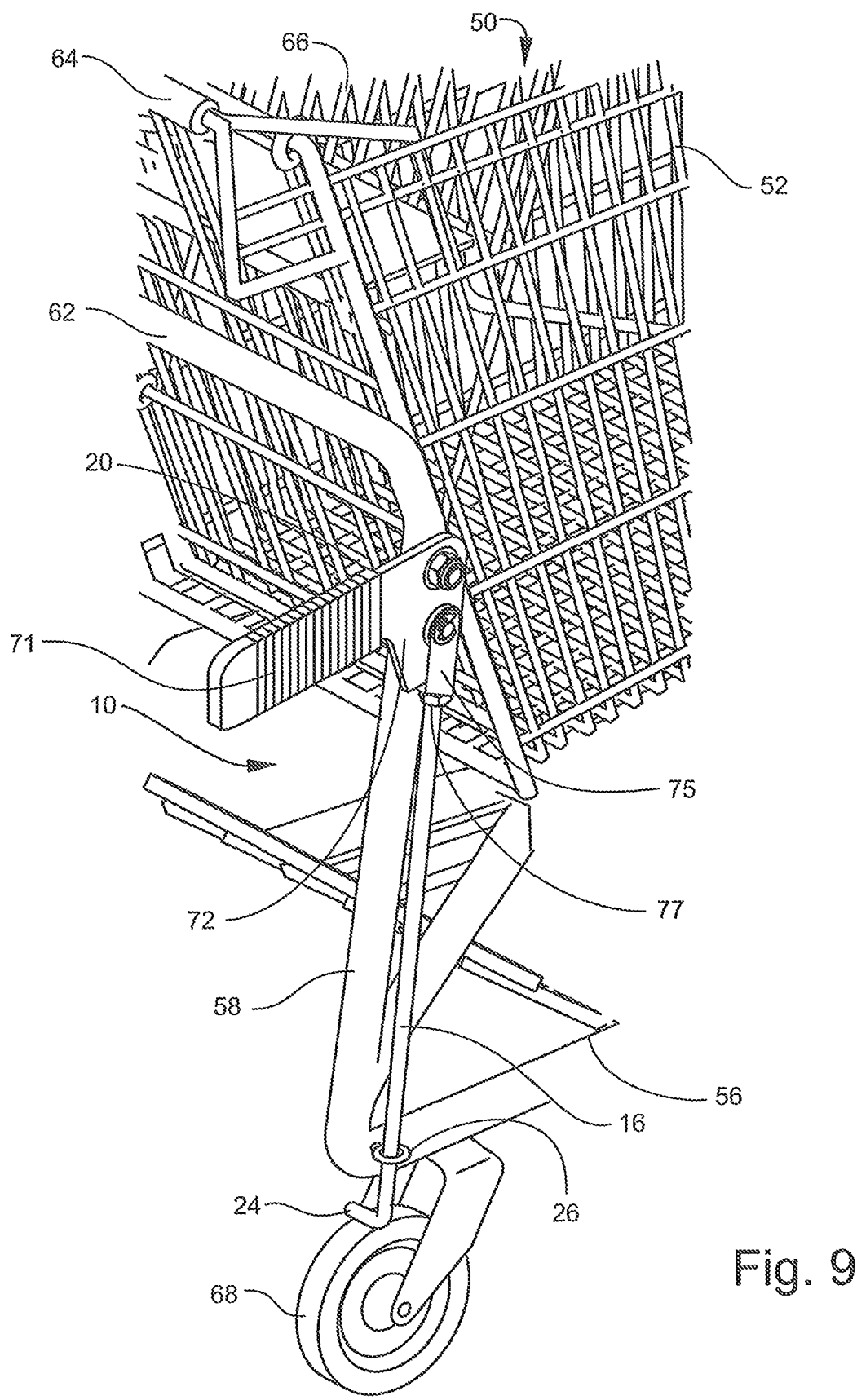
FIG. 9 is a fragmentary environmental view of a brake according to one preferred embodiment of the invention in place on a conventional grocery-type cart, in its braked position.
Figure 10:
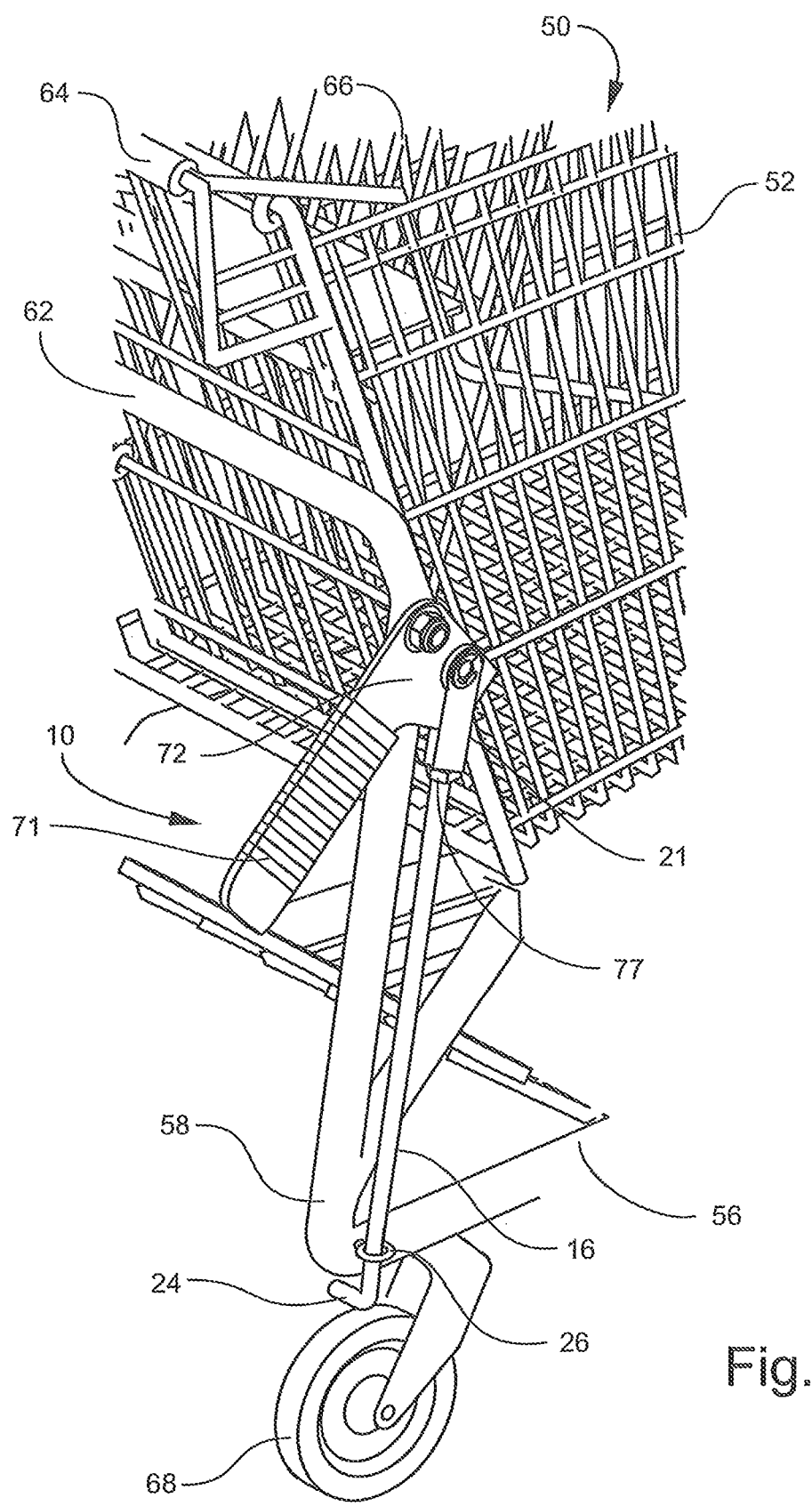
FIG. 10 is a fragmentary environmental view of a brake according to one preferred embodiment of the invention in place on a conventional grocery-type cart, in an intermediate position.
Figure 11:
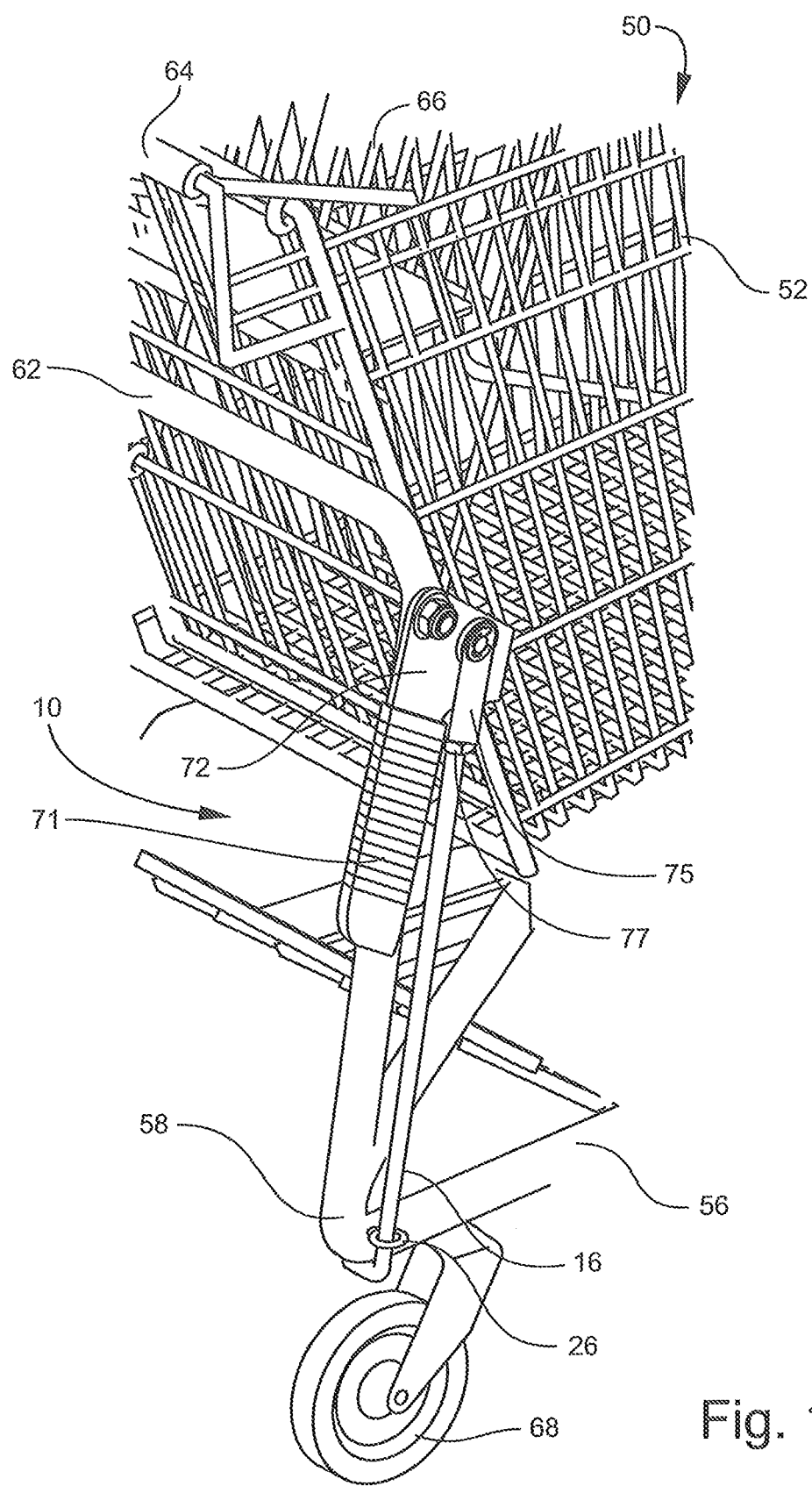
FIG. 11 is a fragmentary environmental view of a brake according to one preferred embodiment of the invention in place on a conventional grocery-type cart, in its free position.

Referring to FIGS. 9-11, the details of the embodiment shown in FIG. 8 is more easily seen in these partial environmental views. FIGS. 9-11 show the handle portion 71 and the cam portion 72 of the brake manipulator 70. The U-shaped channel 75 is shown with a threaded connection 77 to the rod 16. FIG. 9 shows the brake in the braked position and FIG. 11 shows the brake in the free position with FIG. 10 in an intermediate position.

Figure 12:
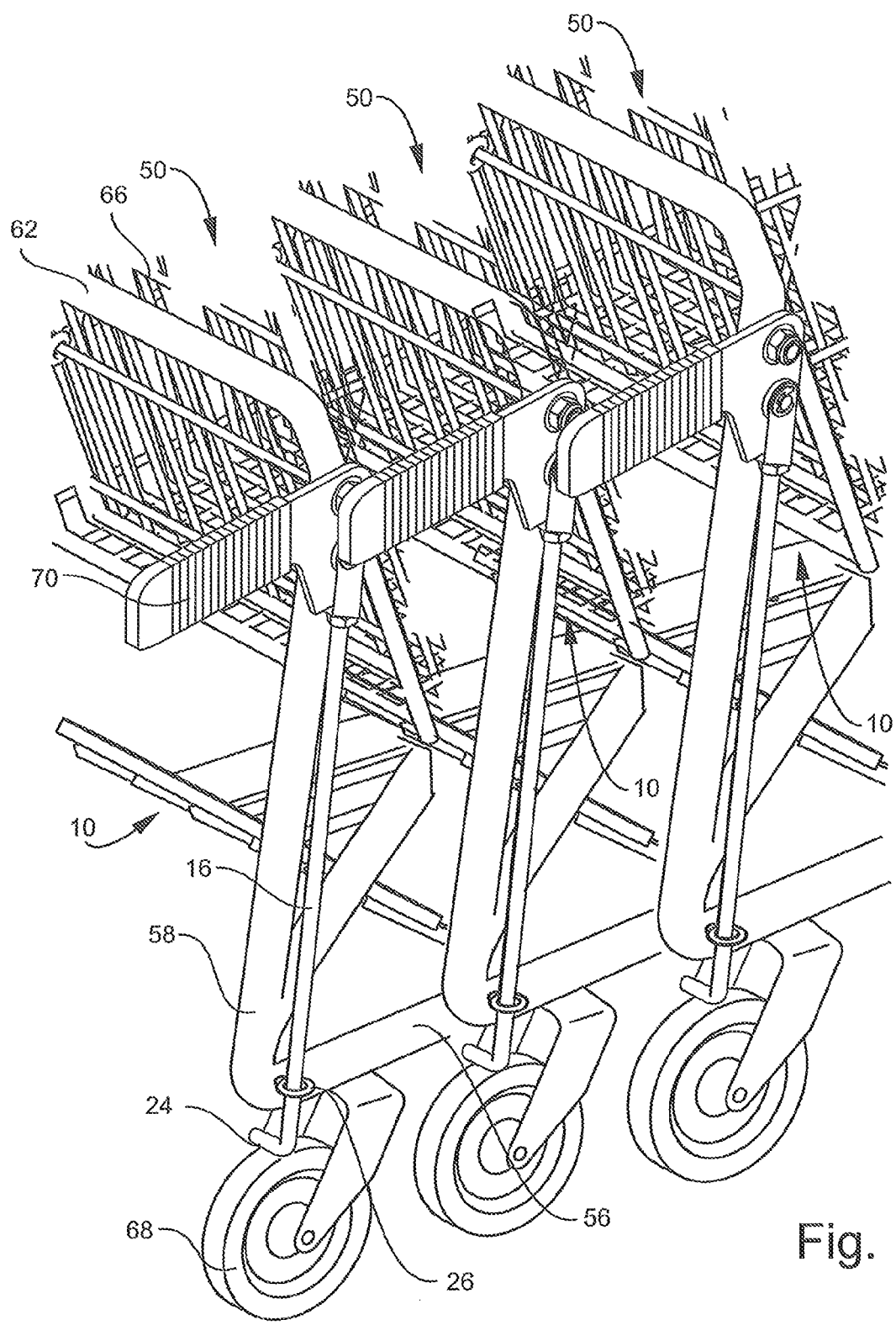
FIG. 12 is a fragmentary environmental view of a brake according to one preferred embodiment of the invention in place on a nested plurality of conventional grocery type carts, with each of the brakes in their respective braked position.

Referring, to FIG. 12, it can be readily seen how multiple carts can be nested one with another while the manipulator 70 is in the braked position on each Cali.

Figure 13:
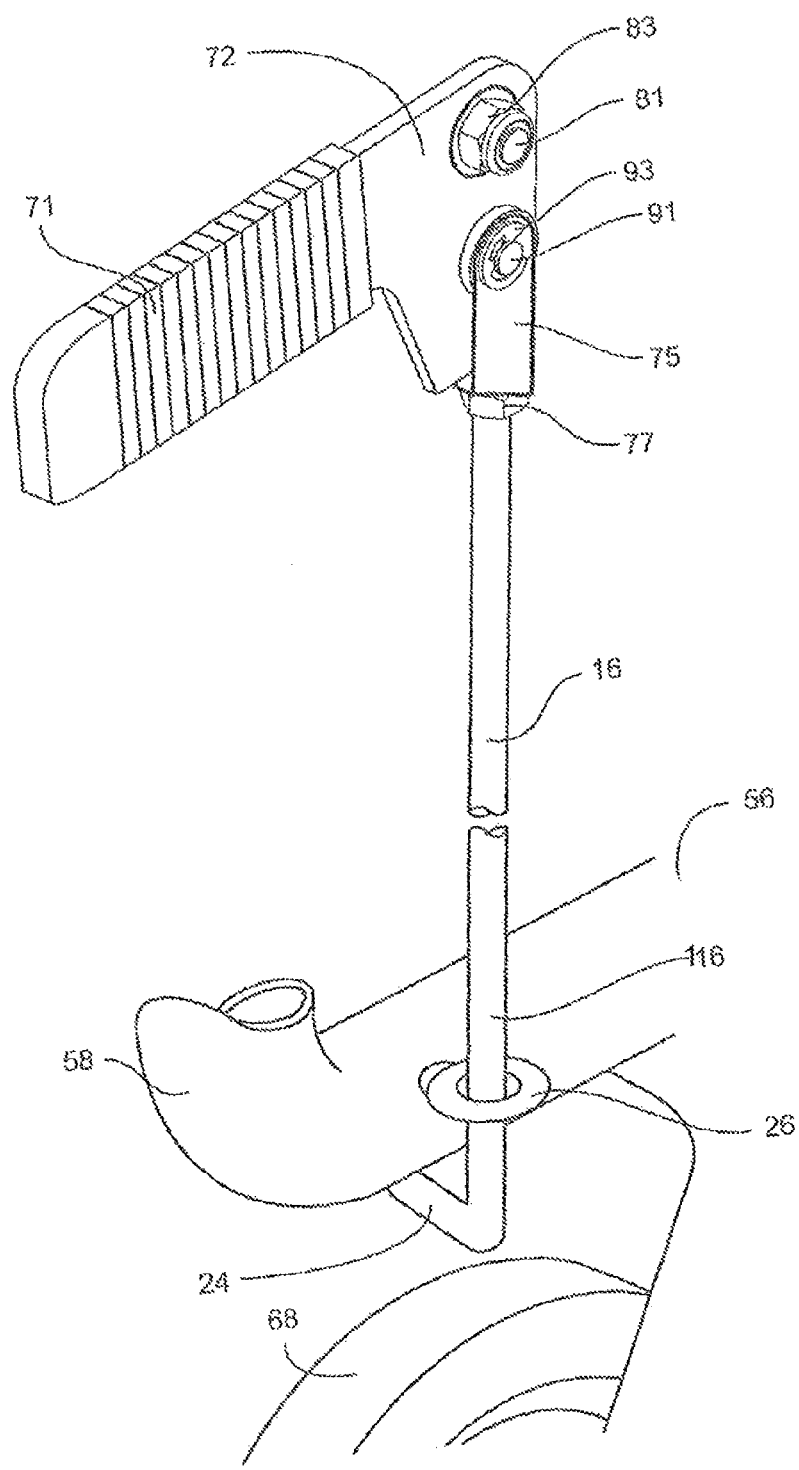
FIG. 13 is a fragmentary enlarged view of the brake according to one preferred embodiment of the invention.

Referring to FIG. 13, the handle portion 71 of the manipulator is shown connected to the cam portion 72 of the manipulator. The handle pivot bolt 81 and the handle pivot nut 83 are shown located at an upper portion of the cam portion 72 of the manipulator 70. Likewise, the brake pivot pin 91 is shown with the brake pivot retainer 93 located at the lower end of the cam portion 72 of the manipulator 70. The brake pivot pin 91 acts to connect the cam portion 72 of the manipulator 70 with the U-shaped channel 75 of the brake member 116. The U-shaped channel 75 is shown connected to the brake member 116 via a threaded connection 77.

Figure 14:
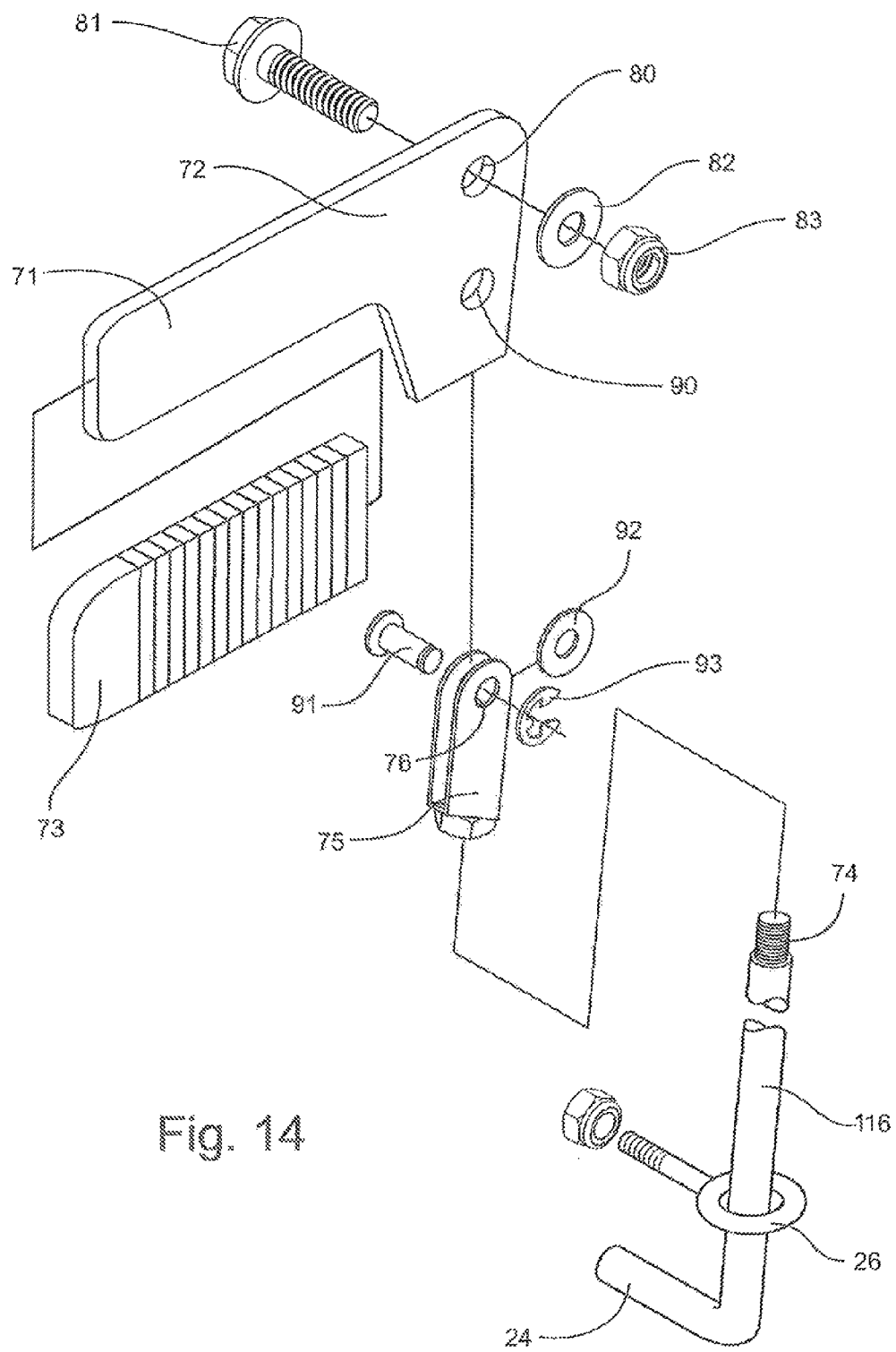
FIG. 14 is an exploded view of the brake shown in FIGS. 8-13, with parts broken away for clarity and compactness.

Referring now to FIG. 14, the exploded view shows how the various elements fit together. A handle grip 73 fits over the handle portion 71 of the manipulator 70. The cam portion 72 has disposed thereon a pair of holes, namely the handle pivot opening 80 and the brake pivot opening 90. The handle pivot opening, 90 acts as the pivot point of the handle against the upright 58 of the frame of the Cali. The cam portion is attached to the cart through handle pivot opening 90 with a threaded connection using handle pivot bolt 81, handle pivot washer 82 and handle pivot nut 83. As the manipulator 70 pivots against the cart via handle pivot bolt 81 located through the handle pivot opening 80, the brake member 116 is pivoted against, a pivot point located at the brake pivot opening 90. The earn portion 72 of the brake manipulator 70 is pivotally attached, to the U-shaped channel 75 of brake member 116 via a pin connection. A brake pivot pin 91 passes through the brake pivot opening 90 and through a pair of openings 76 in the U-shaped channel 75 and is secured in place by a brake pivot retainer 93. A brake pivot washer 92 aids in the pivoting. The U-shaped channel 75 is attached to the rod 16 via a threaded connection 74, the rod also being secured and guided in place by retainer ring 26.

A brake for a cart, and a cart with a user-operable brake is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

I claim:

1. A brake for a wheeled cart of the type having a container supported on at least a pair of rear wheels carried on a cart frame, comprising:
   (a) a brake manipulator pivotally attached to the cart frame for applying the brake to at least one of the rear wheels, further comprising a handle portion for grasping the brake manipulator, a cam portion for operating the brake, a handle pivot opening located near a top portion of the cam portion at a point of pivotal attachment to the cart, and a brake pivot opening displaced from the handle pivot opening by a suitable distance and located near a bottom portion of the cam portion;
   (b) an elongate brake member pivotally attached to the brake manipulator at the brake pivot opening and extending into a position proximate the at least one of said rear wheels; and
   (c) a braking element positioned on a lower end of the rake member for being selectively moved into and out of frictional braking engagement with a tread surface of the wheel,
      wherein the brake member further comprises a U-shaped channel attached to the brake manipulator at the point of pivotal attachment and a rod attached to the U-shaped channel and to the braking element.

2. The brake according to claim 1 wherein the U-shaped channel is attached to the rod via a threaded connection and further comprises a pair of openings on each side of a pair of upper edges of the U-shaped channel that aligns with the brake pivot opening of the brake manipulator.

3. The brake according to claim 2 wherein a brake pivot pin is locked with a brake pivot retainer connecting the U-shaped channel and the brake manipulator through the pair of openings of the U-shaped channel and the brake pivot opening.

4. The brake according to claim 1 wherein the pivotal attachment of the brake manipulator to the cart is achieved by a nut and bolt connection attached through an opening in the cart frame and the handle pivot opening.

5. The brake according to claim 1, wherein the braking element comprises a terminal portion of the rod extending perpendicularly across a width of the tread surface of the wheel.

6. The brake according to claim 5 wherein the suitable distance is correlated to the distance between the tread surface of the wheel and the terminal portion of the rod when the handle portion of the brake manipulator is in the free position such that when the handle portion is in the braked position, the tread surface of the wheel is in contact with the terminal portion of the rod.

7. The brake according to claim 1, further comprising a retainer ring positioned on the cart frame below the handle pivot opening and proximate the at least one rear wheel within which the elongate brake member is positioned for guiding the brake member in its movement into and out of braking engagement.

8. The brake according to claim 7 further comprising a handle grip covering the handle portion of the brake manipulator.

9. A brake for a wheeled cart of the type having a container supported on at least a pair of rear wheels carried on a cart frame, comprising:
   (a) a brake manipulator pivotally attached to the cart frame for applying the brake to at least one of the rear wheels, further comprising a handle portion for grasping the brake manipulator, a cam portion for operating the brake, a handle pivot opening located near a top portion of the cam portion at a point of pivotal attachment to the cart, and a brake pivot opening displaced from the handle pivot opening by a suitable distance and located near a bottom portion of the cam portion;
   (b) an elongate brake member pivotally attached to the brake manipulator at the brake pivot opening and extending into a position proximate the at least one wheel and further comprising a U-shaped channel attached to the brake manipulator at the point of pivotal attachment and a rod attached to the U-shaped channel; and
   (c) a braking element positioned on a lower end of the brake member for being selectively moved into and out of frictional braking engagement with a tread surface of the wheel, and comprising a terminal portion of the rod extending perpendicularly across a width of the tread surface of the wheel.

10. The brake according to claim 9 further comprising a retainer ring positioned on the cart frame below the handle pivot opening and proximate the at least one rear wheel within which the elongate brake member is positioned for guiding the brake member in its movement into and out of braking engagement.

11. The brake according to claim 9 wherein a brake pivot pin is locked with a brake pivot retainer thereby connecting the U-shaped channel and the brake manipulator through the brake pivot opening and a pair of openings on each side of a pair of upper edges of the U-shaped channel.

12. The brake according to claim 11 wherein the U-shaped channel is attached to the rod via a threaded connection.

13. A brake according to claim 11 wherein the suitable distance is correlated to the distance between the tread surface of the wheel and the terminal portion of the rod when the handle portion of the rake manipulator is in the free position such that when the handle portion is in the braked position, the tread surface of the wheel is in contact with the terminal portion of the rod.

14. A brake for a wheeled cart of the type having a container supported on at least a pair of rear wheels carried on a Cali frame, comprising:
  (a) a brake manipulator pivotally attached to the cart frame for applying the brake to at least one of the rear wheels, further comprising a handle portion for grasping the brake manipulator, a cam portion for operating the brake, a handle pivot opening located near a top portion of the cam portion at a point of pivotal attachment to the cart, and a brake pivot opening displaced from the handle pivot opening by a suitable distance and located near a bottom portion of the cam portion;
  (b) an elongate brake member pivotally attached to the brake manipulator at the brake pivot opening and extending into a position proximate the at least one wheel and further comprising a U-shaped channel attached to the brake manipulator at the point of pivotal attachment and a rod attached to the U-shaped channel via a threaded attachment;
  (c) a retainer ring positioned on the cart frame below the handle pivot opening and proximate the at least one rear wheel within which the elongate brake member is positioned for guiding the brake elongate member in its movement into and out of braking engagement;
  (d) a brake pivot pin locked with a brake pivot retainer the by connecting the U-shaped channel and the brake manipulator through the brake pivot opening and a pair of openings on each side of a pair of upper edges of the U of the U-shaped channel; and
  (e) a braking element positioned on a lower end of the brake member for being selectively moved into and out of frictional braking engagement with a tread surface of the wheel, and comprising a terminal portion of the rod extending perpendicularly across a width of the tread surface of the wheel.

15. The brake according to claim 14 wherein the suitable distance is correlated to the distance between the tread surface of the wheel and the terminal portion of the rod when the handle portion of the brake manipulator is in the free position such that when the handle portion is in the braked position, the tread surface of the wheel is in contact with the terminal portion of the rod.

16. The brake according to claim 15 further comprising a handle grip covering the handle portion of the brake manipulator.

* * * * *